Sept. 28, 1965   KARL-HEINZ STEINEBACH ETAL   3,208,279
FEELER-TYPE INTEGRATION FOR MEASURING RATES OF FLOW
Filed March 13, 1961
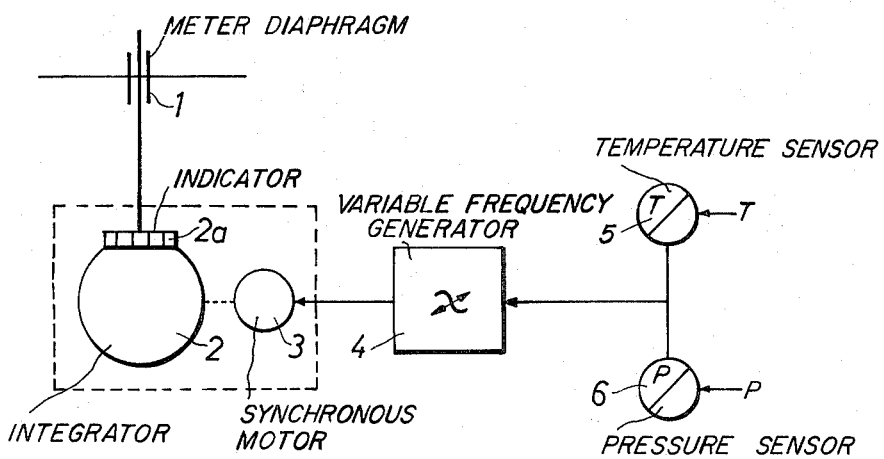
INVENTORS:
KARL HEINZ STEINEBACH, RUDOLF GASS.
BY
Burgess, Dinklage & Sprung
ATTORNEYS 3,208,279
FEELER-TYPE INTEGRATION FOR MEASURING
RATES OF FLOW
Karl-Heinz Steinebach, Leverkusen-Schiebusch, and
Rudolf Gass, Leverkusen-Kuppersteg, Germany, assignors to Farbenfabriken Bayer Aktiengesellschaft, Leverkusen, Germany, a corporation of Germany
Filed Mar. 13, 1961, Ser. No. 95,177
Claims priority, application Germany, Mar. 16, 1960,
F 30,765
4 Claims. (Cl. 73—206)

The invention relates to a feeler-type integration mechanism for measuring rates of flow. An object of the invention is to improve an integration mechanism of this type so that it is possible to correct for the conditional values such as temperature and pressure. The function of a conventional feeler-type integration mechanism when measuring quantities is as follows:

The momentary value of the flow controls (directly or by way of a pneumatic transmitter) the "root-forming disc" of a feeler-type integration mechanism, the positional cam of which is scanned at regular time intervals by a "feeler lever" with "feeler pin" which is moved by a mains-fed driving "synchronous motor." The scanning stroke is then translated by way of a transmission system into a numeral advance on the "cylinder-type counter," the said advance being proportional to the stroke.

According to the present state of the art, it is not possible, as a practical matter, to satisfactorily influence the counting in accordance with the conditional values.

It has now been found that this disadvantage is obviated if, according to the invention, the driving motor of the feeler-type integration mechanism is connected to a frequency generator, which is controlled by at least one condition-dependent transmitter, whereby the generated frequency is varied. Thus, a correction is introduced into the integrator, the said correction being effected by a frequency change of the working voltage of the driving motor of the integration mechanism. The frequency change corresponds to the correction and the measured value is effected so that it is increased by a rise in the frequency and decreased by a lowering of the frequency. The correction factors are applied as corresponding voltages and these voltages are used for controlling the frequency generator.

Thus, the invention provides a device for measurement of material flow, the device comprising a volume flow measuring means responsive to flow volume, an integrating receiver operatively connected to the volume flow means for response to the magnitude of volume flow and a motor drive for said receiver. The integrating receiver is effective to integrate the motor action and the response to the magnitude of volume flow, whereby to measure a response to volume flow. The device further comprises a frequency generator disposed without the material, the flow of which is measured, and for supplying power to the receiver motor drive. Moreover, means are provided for sensing at least one condition of the material, and there are transmitting means responsive to the sensing means and effective to modify the frequency of the frequency generator in dependency on the condition sensed. Thus, the device operates in the manner that the speed of the motor is modified in accordance with the condition sensed to impart to the receiver a signal in accordance with said sensed condition, for integration with the response to volume flow. The condition sensed can be temperature or pressure. Alternatively, both temperature and pressure can be sensed.

One example of the invention is shown diagrammatically in the drawing, in which 1 represents a diaphragm, 2 a feeler-type integration mechanism, 2a an indicator, 3 a driving synchronous motor. The working votage for the synchronous motor 3 is supplied by a frequency generator 4, the frequency of which, with constant voltage, is altered by the conditional values prevailing when measuring the quantities. The reference 5 represents a transmitter which is dependent on temperature, while 6 is a transmitter dependent on pressure. Thus, in the operation of the device, the diaphragm 1 positions a feeler (not shown) in accordance with the volumetric flow rate. The position of the feeler causes the indicator 2a to be advanced a given amount, dependent on the feeler position, for every revolution of motor 3. The speed of the motor is controlled by generator 4, the frequency of which is appropriately varied by the sensing unit 5 (temperature) and 6 (pressure). The control of the frequency generator 4 produced by 5 and 6 can be effected electrically, pneumatically, hydraulically or mechanically, depending on the construction of the frequency generator.

We claim:
1. A device for measurement of material flow comprising volume flow measuring means responsive to flow volume, an integrating receiver operatively connected to the volume flow means for response to the magnitude of volume flow and a synchronous motor drive for said receiver, said integrating receiver integrating motor action and the response to the magnitude of volume flow, a frequency generator disposed without the said material for supplying power to the receiver motor drive, means for sensing at least one condition of the material, transmitter means responsive to the sensing means and effective to modify the frequency of the frequency generator in dependence on the condition sensed, whereby the speed of the motor is modified in accordance with the condition sensed to impart to said receiver a signal in accordance with said sensed condition for integration with the response to volume flow.

2. A device according to claim 1, wherein the means for sensing is for sensing temperature of the material.

3. A device according to claim 1, wherein the means for sensing is for sensing pressure of the material.

4. A device for measurement according to claim 1, said device including means for sensing temperature and means for sensing pressure of the material.

References Cited by the Examiner

UNITED STATES PATENTS

| | | | |
|---|---|---|---|
| 1,305,803 | 6/19 | Irwin | 73—233 |
| 2,222,551 | 11/40 | Ziebolz et al. | 73—233 |
| 2,715,680 | 8/55 | Tatel et al. | 73—398 |
| 2,901,173 | 8/59 | Clicques | 73—194 |
| 2,914,944 | 12/59 | Ballard | 73—194 |

FOREIGN PATENTS 758,094  9/56  Great Britain.

RICHARD C. QUEISSER, *Primary Examiner.*

ROBERT L. EVANS, JOSEPH P. STRIZAK, *Examiners.*